United States Patent
Wiehe

(10) Patent No.: US 9,819,615 B2
(45) Date of Patent: Nov. 14, 2017

(54) OVERLOAD PROTECTION IN A COMMUNICATION NETWORK

(71) Applicant: NOKIA SOLUTIONS AND NETWORKS OY, Espoo (FI)

(72) Inventor: Ulrich Wiehe, Bad Hersfeld (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/889,038

(22) PCT Filed: May 7, 2013

(86) PCT No.: PCT/EP2013/059457
§ 371 (c)(1),
(2) Date: Nov. 4, 2015

(87) PCT Pub. No.: WO2014/180498
PCT Pub. Date: Nov. 13, 2014

(65) Prior Publication Data
US 2016/0080290 A1    Mar. 17, 2016

(51) Int. Cl.
*H04L 12/931*    (2013.01)
*H04L 12/823*    (2013.01)
*H04L 29/06*    (2006.01)

(52) U.S. Cl.
CPC .............. *H04L 49/50* (2013.01); *H04L 47/32* (2013.01); *H04L 67/42* (2013.01); *H04L 69/22* (2013.01)

(58) Field of Classification Search
CPC ......... H04L 47/32; H04L 49/50; H04L 67/42; H04L 69/22; H04L 47/125;
(Continued)

(56) References Cited

U.S. PATENT DOCUMENTS 8,660,600 B2 * 2/2014 Khandekar ......... H04W 52/146
                                                    455/115.4
8,699,343 B2 * 4/2014 Abdelal ................ H04L 47/263
                                                    370/235
(Continued)

OTHER PUBLICATIONS

3GPP / Network Working Group, Internet-Draft, E. McMurry and B. Campbell, Tekelec, Sep. 21, 2012, Diameter Overload Control Requirements, draft-ietf-dime-overload-reqs-00 / Sep. 21, 2012.
(Continued)

*Primary Examiner* — Mohamed Kamara
(74) *Attorney, Agent, or Firm* — Squire Patton Boggs (US) LLP

(57) ABSTRACT

In an apparatus of a communication network it is determined whether or not overload protection processing has been requested by a server, the overload protection processing being performed by dropping messages. In case it is determined that the overload protection processing has not been requested, a message to be sent from a client to the server is processed according to a security protocol. In case it is determined that the overload protection processing has been requested, the message is processed according to the security protocol by adopting the overload protection processing, and a predetermined indication is included in the message processed according to the security protocol by adopting the overload protection processing, in case the message is not dropped.

9 Claims, 2 Drawing Sheets

(58) Field of Classification Search
CPC ......... H04L 29/08135; H04L 29/08144; H04L 29/0306; H04L 29/08; G06F 9/5083; H04W 28/08
See application file for complete search history.

(56) References Cited

U.S. PATENT DOCUMENTS

| | | | | |
|---|---|---|---|---|
| 2011/0199897 A1* | 8/2011 | Shin | ...................... | H04W 28/02 370/230 |
| 2011/0295996 A1* | 12/2011 | Qiu | ........................ | H04L 47/10 709/224 |
| 2015/0109911 A1* | 4/2015 | Cha | ...................... | H04W 28/08 370/230 |

OTHER PUBLICATIONS

3GPP / Diameter Maintenance and Extensions (DIME), J. Korhonen, Ed., Nokia Siemens Networks, Internet-Draft Oct. 3, 2012, Diameter Overload Control Application, draft-korhonen-dime-ovl-00.txt / Oct. 3, 2012.
3GPP / DIME, Internet-Draft, A. B. Roach/Tekelec, Oct. 22, 2012, A Mechanism for Diameter Overload Control, draft-roach-dime-overload-ctrl-01 Oct. 22, 2012.
3GPP TR 29.809 V0.2.0 (Apr. 2013), 3GPP, Technical Specification Group Core Network and Terminals, Study on Diameter overload control mechanisms (Release 12) / Apr. 29, 2013.
Calhoun et al / Diameter Base Protocol, rfc 3588.
Nokia Siemens Networks / C4-130615, Pseudo-CR on Multiple Throttling by Factor / May 10, 2013.
International Search Report and Written Opinion dated Feb. 10, 2014, issued in corresponding International Application No. PCT/EP2013/059457.

* cited by examiner

OVERLOAD PROTECTION IN A COMMUNICATION NETWORK

BACKGROUND OF THE INVENTION

Field of the Invention

The present invention relates to overload protection in a communication network. In particular, the invention relates to a mechanism for overload protection by dropping messages communicated based on a security protocol, e.g. the Diameter protocol.

Related Background Art

The following meanings for the abbreviations used in this specification apply:
DRA Diameter Routing Agent
HSS Home Subscriber Server
MME Mobility Management Entity When a server of a communication network is under high load it may request its clients to adopt message throttling. For example, messages sent from the clients to the server should be reduced by a throttling factor of 10%. Then, clients supporting the message throttling throttle outgoing traffic towards the sever by dropping one out of ten messages. If this does not result in sufficient load reduction, the server may request the clients to drop more (e.g. 20%) messages. When the (over)load situation in the server becomes more relaxed the server may indicate to the clients that the throttling factor can be lowered or even throttling is no longer required.

SUMMARY OF THE INVENTION

The present invention aims at providing an efficient overload protection even for a communication network comprising clients supporting an overload protection mechanism and clients not supporting the overload protection mechanism, routing agents located between the clients and the server, supporting the overload protection mechanism, and routing agents located between the clients and the server, not supporting the overload protection mechanism.

This is at least in part achieved by the method and apparatus as defined in the appended claims. The invention may also be implemented by a computer program product.

According to an exemplary embodiment of the invention, clients supporting message throttling as an overload protection mechanism mark messages that have survived a throttling. Furthermore, routing agents supporting the message throttling perform throttling only on non marked messages, and mark messages that have survived the throttling before transferring them to the next hop.

Marking of survived messages is applicable to all Diameter clients and agents that implement the overload protection mechanism.

Reacting on marked messages is applicable to all Diameter agents and servers implementing the overload protection mechanism.

In the following the invention will be described by way of exemplary embodiments thereof with reference to the accompanying drawings.

DESCRIPTION OF THE EXEMPLARY EMBODIMENTS

According to a mechanism for overload protection in a communication network, a server (e.g. a Diameter Server such as an HSS), when detecting that it is under high load, indicates to clients (e.g. MMEs)—possibly via routing agents (e.g. DRAs)—that an amount of messages (e.g. Diameter messages) sent from the clients to the server (possibly via the routing agents) is to be reduced by a certain factor.

This overload protection mechanism may not be supported by all clients and all agents. Non-supporting clients will ignore the request for overload protection, e.g. to throttle traffic, and will continue sending the full amount of messages. Non-supporting agents also will not throttle traffic, but are able and will transparently transfer an overload protection (e.g. throttling) request message from the server to the clients.

Figure 1:
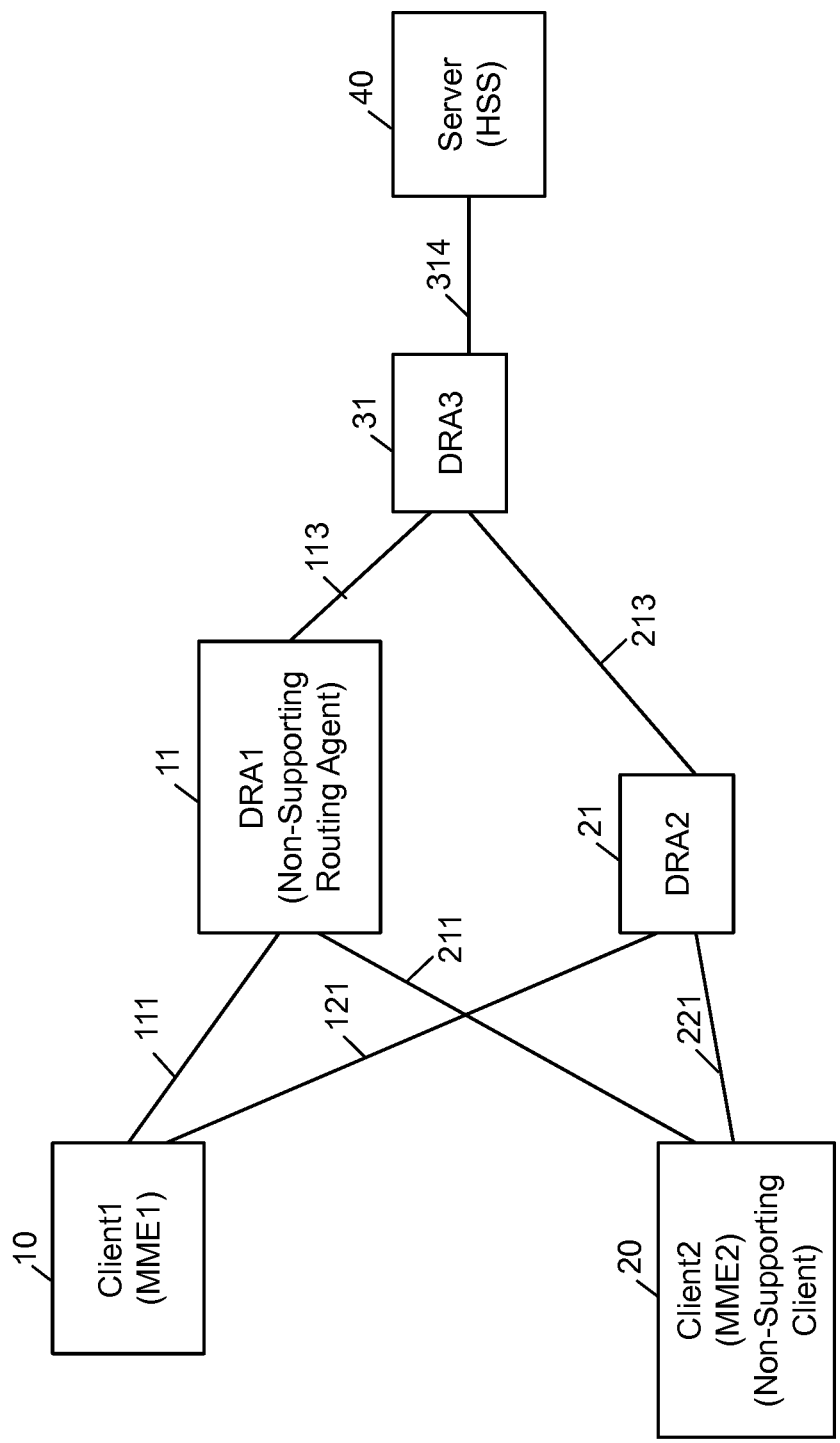
FIG. 1 shows a schematic block diagram illustrating a configuration according to an exemplary embodiment of the invention.

FIG. 1 shows an example configuration where two clients 10, 20 (MME1 and MME2) are connected to a server 40 (HSS) by routing agents DRA1 11, DRA2 21 and DRA3 31. In this example, Client2 20 and DRA1 11 do not support the overload protection mechanism.

Client1 10 is connected to DRA1 11 via a link 111, and to DRA2 21 via a link 121. Client2 20 is connected to DRA1 11 via a link 211 and to DRA2 21 via a link 221. DRA1 11 is connected to DRA3 via a link 113, and DRA2 21 is connected to DRA3 via a link 213. DRA3 31 is connected to the server 40 via a link 314.

Supporting routing agents 21, 31 directly connected to non-supporting routing agents/clients 11, 20 may perform overload protection, e.g. traffic throttling, on behalf of the directly connected non-supporting routing agent/client 11, 20. In other words, the supporting routing agents 21, 31 will drop a certain amount of messages received from the non-supporting client/routing agent 20, 11.

As can be seen from FIG. 1, when overload protection, e.g. traffic throttling, is requested by the HSS 40, DRA3 31 has to drop a certain amount of messages received from the non-supporting MME2 20 via DRA1 11. However, DRA3 31 must not drop messages received from MME2 20 via DRA2 21, as DRA2 21 already dropped messages on behalf of MME2 20. Further, DRA3 31 must not drop messages received from MME1 10 via DRA1 11 or DRA2 21.

Similarly, as can be seen from FIG. 1, when overload protection, e.g. traffic throttling, is requested by the HSS 40, DRA2 21 has to drop a certain amount of messages received from the non-supporting MME2 20. However, DRA2 21 must not drop messages received from MME1 10.

In general, messages that already "survived" an overload protection processing, e.g. throttling, by MME1 10 or DRA2 21 must not be subjected to further overload protection processing, e.g. throttling, at DRA2 21 or DRA3 31.

Figure 2:
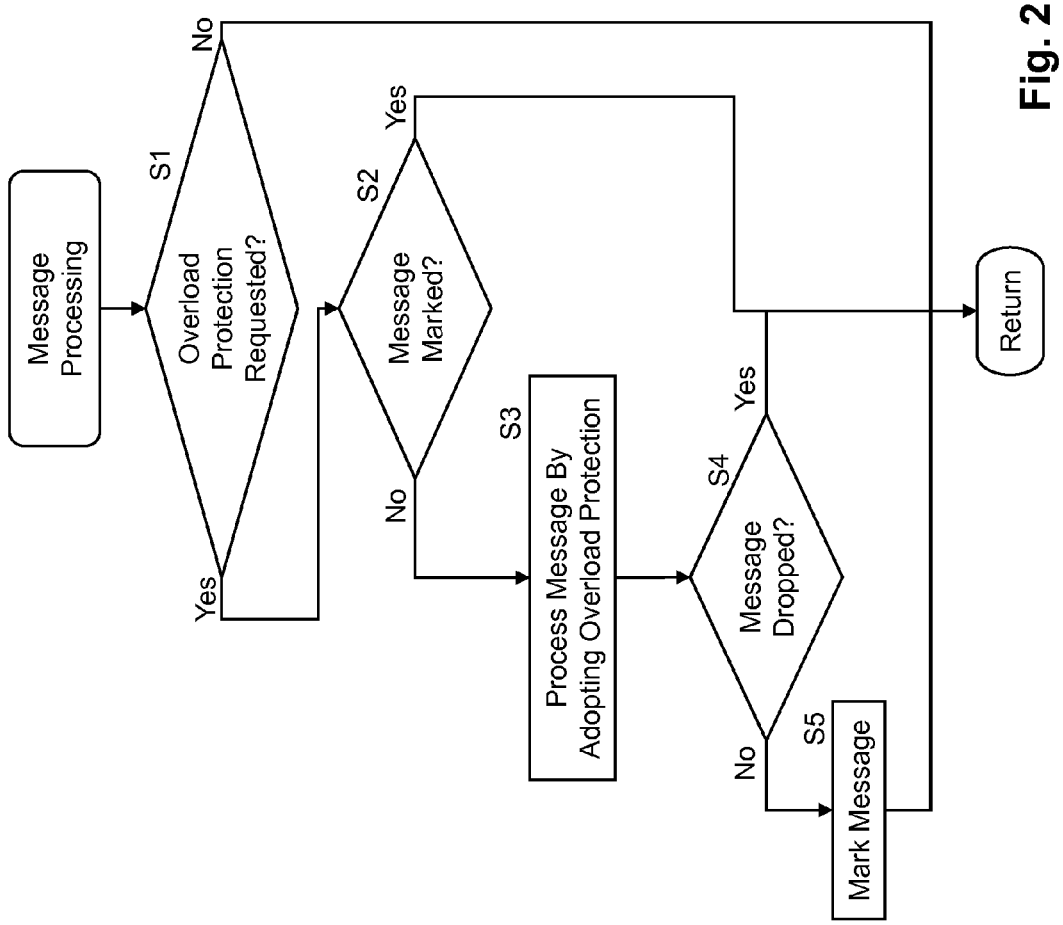
FIG. 2 shows a flowchart illustrating message processing according to an exemplary embodiment of the invention.

In order to enable DRA2 21 and DRA3 31 to determine whether or not a received message has already survived a throttling, according to an exemplary embodiment of the invention, an overload processing mechanism as illustrated in FIG. 2 is provided.

FIG. 2 shows a flowchart illustrating message processing for the overload processing mechanism according to the exemplary embodiment of the invention. The message processing may be performed by an apparatus of a communication network, e.g. a client and/or routing agent, such as the client1 10 and DRA2 21 and DRA3 31 of FIG. 1.

In step S1, a check is performed to determine whether overload protection processing is requested by a server, e.g. the HSS 40 of FIG. 1. The overload protection processing may be performed by dropping messages to be sent from the clients to the server.

In case the overload protection processing is not requested (no in step S1), the process returns and a message to be sent from a client to the server is processed according to a security protocol, e.g. the Diameter protocol. Since this is the usual message processing, its description is omitted here.

In contrast, in case the overload protection processing is requested (yes in step S1), the message is processed according to the security protocol by adopting the overload protection processing (step S3), and a predetermined indication is included (the message is marked, cf. step S5) in the message processed according to the security protocol by adopting the overload protection processing, in case the message is not dropped (no in step S4). Otherwise, the process returns. In case the message processing of FIG. 2 is executed by a client, step S2 can be skipped.

Otherwise, in case the message processing of FIG. 2 is executed by a routing agent, in step S2 it is detected whether or not the message includes the predetermined indication indicating that the message has been subjected to the overload protection processing. In other words, in step S2 it is detected whether or not the message has already been marked by an overload processing in a previous hop.

In case it is detected that the message does not include the predetermined indication (no in step S2), the message is processed according to the security protocol by adopting the overload protection processing. Otherwise, the process returns which means that the message is processed according to the security protocol (the usual message processing), not adopting the overload protection processing.

The predetermined indication may be included e.g. in a header of the message. For example, the message may be marked by a spare command flag in the Diameter Header before sending it to the next hop.

Figure 3:
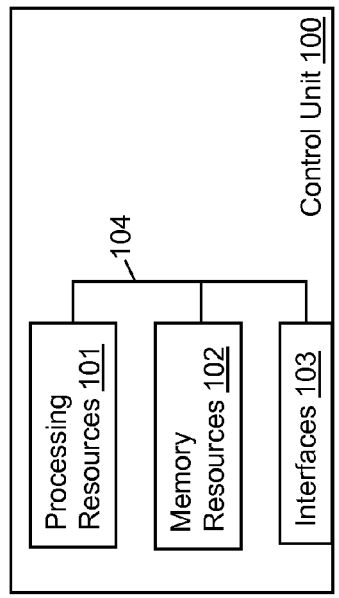
FIG. 3 shows a schematic block diagram illustrating a configuration of a control unit in which examples of embodiments of the invention are implementable.

Now reference is made to FIG. 3 for illustrating a simplified block diagram of a control unit 100 that is suitable for use in practicing the exemplary embodiments of this invention.

The control unit 100 may be part of and/or used by an apparatus of a communication network, supporting the above-described overload protection mechanism. For example, the client1 10, DRA2 21 and DRA3 31 include and/or make use of the control unit 100.

The control unit 100 comprises processing resources 101, memory resources 102 which may store a program, and interfaces 103. The processing resources 101, memory resources 102 and interfaces are linked by a connection 104. The interfaces 103 enable connection of the client1 10 to DRA1 11 via link 111 and to DRA2 21 via link 121 when the client1 10 uses the control unit 100, connection of the DRA2 21 to the client1 10 via link 121, to client2 20 via link 221 and to DRA3 31 via link 213 when the DRA2 21 uses the control unit 100, and connection of the DRA3 to DRA1 11 via link 113, to DRA2 21 via link 213 and to the server 40 via link 314 when the DRA3 31 uses the control unit 100.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

In general, the exemplary embodiments of this invention may be implemented by computer software stored in the memory resources 102 and executable by the processing resources 101, or by hardware, or by a combination of software and/or firmware and hardware.

The memory resources 102 may be of any type suitable to the local technical environment and may be implemented using any suitable data storage technology, such as non-transitory computer readable medium, semiconductor-based memory devices, magnetic memory devices and systems, optical memory devices and systems, fixed memory and removable memory. The processing resources 101 may be of any type suitable to the local technical environment, and may include one or more of general purpose computers, special purpose computers, microprocessors, digital signal processors (DSPs) and processors based on a multi-core processor architecture, as non-limiting examples.

According to an aspect of the invention, an apparatus of a communication network is provided, which may include and/or use the control unit 100, e.g. for executing the process shown in FIG. 2.

The apparatus comprises means for determining whether or not overload protection processing has been requested by a server, the overload protection processing being performed by dropping messages, and means for, in case it is determined that the overload protection processing has not been requested, processing a message to be sent from a client to the server according to a security protocol, and means for, in case it is determined that the overload protection processing has been requested, processing the message according to the security protocol by adopting the overload protection processing, and for including a predetermined indication in the message processed according to the security protocol by adopting the overload protection processing, in case the message is not dropped.

The means for including may include the predetermined indication in a header of the message.

According to an exemplary embodiment of the invention, the apparatus comprises means for, in case it is determined that the overload protection processing has been requested, detecting whether or not the message includes the predetermined indication indicating that the message has been subjected to the overload protection processing, wherein in case it is detected that the message does not include the predetermined indication, the means for processing process the message according to the security protocol by adopting the overload protection processing, and in case it is detected that the message includes the predetermined indication, the means for processing process the message according to the security protocol, not adopting the overload protection processing.

The predetermined indication may be included in a header of the message.

According to at least one exemplary embodiment of the invention, the security protocol is a diameter protocol, and/or the server is a home subscriber server, and/or the client is a mobility management entity, and/or the apparatus comprises the mobility management entity and/or a diameter routing agent.

The means for determining, processing, including and detecting may be implemented by the processing resources 101, the memory resources 102 and the interfaces 103. The means for determining, processing, including and detecting may also included in a controller and a processor of the apparatus, which may be implemented by the processing resources 101, the memory resources 102 and the interfaces 103.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by an apparatus of a communication network, the method comprising:
    determining whether or not overload protection processing has been requested by a server, the overload protection processing includes dropping messages;
    in case it is determined that the overload protection processing has not been requested, processing a message to be sent from a client to the server according to a security protocol;
    in case it is determined that the overload protection processing has been requested, processing the message according to the security protocol by adopting the overload protection processing;
    determining if the message was dropped during the processing of the message; and
    if it is determined that the message was not dropped during the processing of the message, including a predetermined indication in the message processed according to the security protocol by adopting the overload protection processing.

2. The method of claim 1, comprising:
    in case it is determined that the overload protection processing has been requested, detecting whether or not the message includes the predetermined indication indicating that the message has been subjected to the overload protection processing;
    in case it is detected that the message does not include the predetermined indication, processing the message according to the security protocol by adopting the overload protection processing; and
    in case it is detected that the message includes the predetermined indication, processing the message according to the security protocol, not adopting the overload protection processing.

3. The method of claim 1, wherein the predetermined indication is included in a header of the message.

4. The method of claim 1, wherein
    the security protocol is a diameter protocol, and/or
    the server is a home subscriber server, and/or
    the client is a mobility management entity, and/or
    the apparatus comprises the mobility management entity and/or a diameter routing agent.

5. A non-transitory computer readable medium comprising a computer program that when executed by a processor, causes the processor to:
    determine whether or not overload protection processing has been requested by a server, the overload protection processing includes dropping messages;
    in case it is determined that the overload protection processing has been requested, process the message by adopting the overload protection processing;
    determine if the message was dropped during the processing of the message; and
    if it is determined that the message was not dropped during the processing of the message, include a predetermined indication in the message processed by adopting the overload protection processing, in case the message is not dropped.

6. An apparatus of a communication network, the apparatus comprising:
    a controller configured to determine whether or not overload protection processing has been requested by a server, the overload protection processing includes dropping messages; and
    a processor configured to,
    in case the controller determines that the overload protection processing has not been requested, process a message to be sent from a client to the server according to a security protocol,
    in case the controller determines that the overload protection processing has been requested, process the message according to the security protocol by adopting the overload protection processing,
    determine if the message was dropped during the processing of the message, and
    if it is determined that the message was not dropped during the processing of the message, include a predetermined indication in the message processed according to the security protocol by adopting the overload protection processing, in case the message is not dropped.

7. The apparatus of claim 6, wherein
    in case the controller determines that the overload protection processing has been requested, the controller is configured to detect whether or not the message includes the predetermined indication indicating that the message has been subjected to the overload protection processing;
    in case the controller detects that the message does not include the predetermined indication, the processor is configured to process the message according to the security protocol by adopting the overload protection processing; and
    in case the controller detects that the message includes the predetermined indication, the processor is configured to process the message according to the security protocol, not adopting the overload protection processing.

8. The apparatus of claim 6, wherein the predetermined indication is included in a header of the message.

9. The apparatus of claim 6, wherein
    the security protocol is a diameter protocol, and/or
    the server is a home subscriber server, and/or
    the client is a mobility management entity, and/or
    the apparatus comprises the mobility management entity and/or a diameter routing agent.

* * * * *